Dec. 26, 1961 LARS-JOHAN SÖDERSTRÖM 3,014,689
TUBE COUPLING PROVIDED WITH LOCKING MEANS
Filed Aug. 22, 1957

INVENTOR
Lars-Johan Söderström
BY Sommers & Young
ATTORNEYS

United States Patent Office 3,014,689
Patented Dec. 26, 1961

3,014,689
TUBE COUPLING PROVIDED WITH
LOCKING MEANS
Lars-Johan Söderström, Skogsvagen 11, Gusum, Sweden
Filed Aug. 22, 1957, Ser. No. 679,732
4 Claims. (Cl. 251—151)

This invention relates to coupling for tubular elements, for instance, hose, and has for its main purpose to provide a coupling which is easy to connect and disconnect.

A further object of this invention is to construct a rigid, tight coupling, simple in its construction and durable in use. Another object is to supply one of the coupling members with a throttle to keep the coupling member closed if desired, this being especially useful when changing between connected and disconnected coupling.

Referring to the drawing illustrating several embodiments of the invention,

Figure 1:
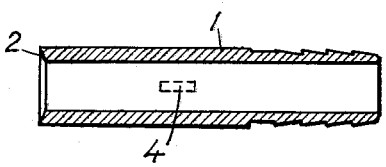
FIGURE 1 is a longitudinal section of a view taken through one of the coupling members.

In the drawings the coupling member 1, FIG. 1, is a tube having one end 2 shaped with an interior conical bevel with the apex, in extension, of the cone located towards the other end 3 of the tube. The member 1 has two projections 4, 5 on its outer surface symmetrically oppositely located at some distance from the bevelled end. The coupling member 1 is inserted in the other member 6 which has a bell-like circular part surrounding the end 2 of the coupling member 1, and is provided at its inner interior portion with a seat 7, for a packing 8 made of rubber or any other yielding material. The inner interior end 9 of the bell-like part is in the form of a cone with its top apex in extension, located towards the other end 10 of the member 6. The other member 6 has two elongations 11, 12 extending from the seat 7 along the outside of the inner member 1. On each one of said elongations 11 and 12 a double hook arrangement 13, 14 is provided comprising parts 15, 16 abutting against the ends of the projections 4, 5, respectively and fixing the members in the axial direction with the elastic packing 8 somewhat compressed between the cone-shaped end 2 and cone-shaped end 9 of the members, and with the parts 17, 18 having overhanging lips 17′ and 18′ overlapping the projections 4, 5, respectively. The elongations and/or hooks lying against the outside of the inner member 1 cooperating with the projections 4 and 5 steadily held by the hooks provide for the exact maintenance of the two coupling members in axial alignment.

The resilient or elastic packing 8 presses the projections 4 and 5 and end hooks 13 and 14 against each other respectively and this securing effect is increased as an inner fluid pressure compresses the packing, so that its ends glide out on the coned ends resulting in a wedging effect in the axial direction increasing proportionally to the inner fluid pressure.

Figure 3:
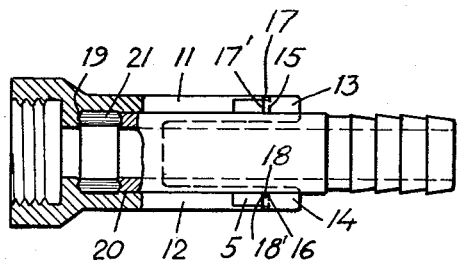
FIGURE 3 is a plan view partially in longitudinal section showing the coupling members connected.
Figure 6:
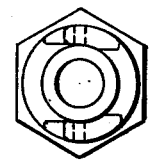
FIGURE 6 is an end view of the coupling according to FIG. 3.

In FIG. 3 the ends 19, 20 of the other coupling member and the packing 21 abutting against them are double coned to prevent the inner edges of the packing from being damaged. The end portion 22 is supplied with interior threads for connection to a pipeline, while the other members are shown with the usual arrangement for attachment of a hose end.

Figure 2:
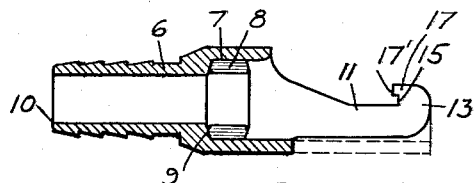
FIGURE 2 is a longitudinal sectional view through the other member.

The extending parts 11, 12, FIG. 2 can be connected to one semi-cylindrical part as shown with dotted lines.

Figure 4:
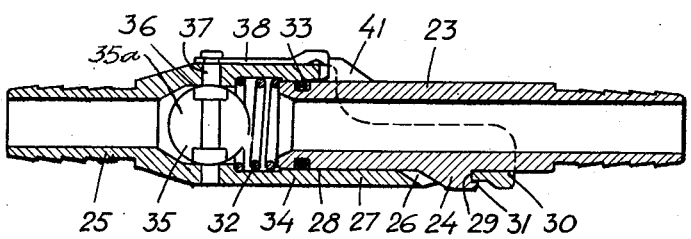
FIGURE 4 is a longitudinal sectional view through a connected coupling in another form provided with a throttle.
Figure 5:
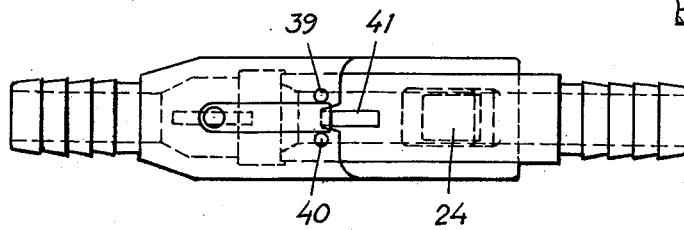
FIGURE 5 is a plan view of the connected coupling.

Other arrangements and combinations of the hooks and projections are possible and one is shown in FIGS. 4 and 5. In this embodiment the inner member 23 is provided with an exterior hook 24 and the other member 25 with an opening 26 in a more or less semi-cylindrical elongation 27 beyond the seat 28 in which opening the hook 24 is inserted. The hook has one part 29 abutting against the other part 30, of the elongation fixing the members in the axial direction and an overhanging part 31 overlapping the fixing part 29 and gripping over the other part 30 in a similar way as previously described.

A spring 32 performs a similar elastic function as the yielding packing 8, and 21 of FIGS. 2 and 3 respectively to keep the coupling members in locked position and the sealing packing consists of a ring 33 made of rubber or similar material and is seated in a groove round the end of the inner member and seals against the seat 28. The packing can alternatively be placed in a groove in the seat as marked with dotted lines 34. A throttle 35, in the form of a disc 35a, is inserted in the bore 36 of the outer member 25 and is turnable round an axle 37 connected with a turning device consisting of a lever 38 that can be fixed between two knobs 39, 40, FIG. 5 when positioned for open throttle.

The end of the lever 38 abuts against the outwardly extending end surface of a projection 41 on the inner member 23 in said position. By this arrangement the members 23, 25 are prevented from moving axially toward one another, and as a disconnection only can occur after such a movement, the members are secured against unintentional disconnection, caused by, for example an interfering person, a child or the like. If the tubing conveys a fluid or gas that absolutely can not be allowed to flow out this securing effect may be of great importance. Even with a distance between the lever end and the projection 41 less than the length of the projecting lip 31 of hook 24 the members are prevented from being disconnected. The lever 38 is, for example, made from an elastic metal plate and is lifted over one of the knobs 39 or 40, when turned from the axial alignment to a right-angle position, turning the axle 37 and the disc 35 so that the passage through the member is shut. As the lever end is not directed against the projection 41 the coupling members now can be disconnected if desired.

Figure 7:
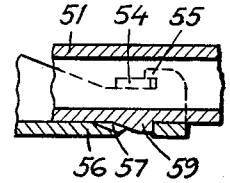
FIGURE 7 is a longitudinal sectional view of a further embodiment involving the means for locking the members together.

In FIG. 7 locking means is illustrated which involves a combination of features taken from previously described embodiments. In this embodiment the inner coupling member 51 is provided with opposite projections similar to projections 4 and 5 of FIGS. 1 and 3; one only of these being represented in FIG. 7 and designated 54. The outer member has overhanging hook means 55 similar to that of FIGS. 2 and 3 for engaging over the projections of the inner member. Outer member 56 is provided with an opening designated 57 in FIG. 7 into which a locking projection 59 extends to hold the coupling members against unintentional axial disengagement.

Figure 8:
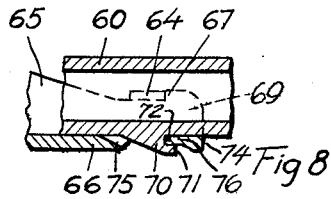
FIGURE 8 is a longitudinal sectional view of a further embodiment involving other means for locking the members together.

In the embodiment according to FIG. 8 the inner coupling member 60 is provided with a pair of opposed symmetrical projections one of which is represented and designated 64. Extension 66 of outer coupling member 65 has a lateral projection 67 at its end portion 69 which overlaps and contacts projection 64. Inner member 60 is provided on its outer surface a further projection 70 having an overhanging hook-like lip 71 forming a recess 72, and outer member 65 has an extension 74 provided with an opening 75 into which projection 70 extends, and the forward edge 76 of the opening 75 engages in recess 72.

I claim:

1. A coupling comprising a pair of coupling members, a portion of one of which extends within the other when coupled and interengaging locking means on each said coupling member securing them axially and radially, a resiliently compressible means operably mounted between said coupling members, said other member having an end portion surrounding the inserted portion of said one member, said other member being provided with a projecting portion extending beyond the portion thereof in conjunction with the inserted portion surrounding said one member, said locking means of said members comprising a cooperating hook and projection, said hook having an axially extending lip overlapping said projection, said hook and projection constituting means fixing the relative axial positions of said couplings with said resiliently compressible means located therebetween in a condition of compression when said hook overlaps said projection, whereby in the axial direction said resiliently compressible means maintains said hook and projection means in engagement against unintentional separation and also prevents lateral relative movement of said coupling members when said lip overlaps said projection, said projection portion of said surrounding member being semi-circular in cross section and partially encompassing said one member and, in conjunction with said hook and projection providing support for said first member in the radial direction and maintaining said members in alignment, said members at a position within said surrounding portion of said other member, being provided with a packing seat, a packing operatively engaging said seat and the other of said coupling members, said compressible means comprising a spring.

2. A coupling according to claim 1 and in which one of said members is provided with a swingable throttle, a pivot pin on which said throttle is mounted, said pin extending transversely across said member and passing through its wall, a lever operably connected with said pivot pin for turning said pin and throttle, and knob means on said member for securing said lever in a desired position.

3. A coupling member according to claim 2 and in which said lever and the other of said coupling members are provided with interengaging axially abutting projections providing additional locking means for restraining said coupling members against axial movement towards one-another and separation when said lever is located in open-throttle position and allowing relative axial movements between said members when said lever is moved from between said knob means to effect disengagement of said hook lip from said projection and relative lateral movement of said coupling members.

4. A coupling comprising two tubular coupling members, each having a mouth, a portion of one of said members being inserted within the other when coupled, said one of said coupling members having a projection, said other coupling member having an elongated portion extending along and semi-circularly surrounding the inserted coupling member and being provided with a projection engaging said projection of the inserted member with a common surface arranged mainly perpendicularly to the longitudinal axis of the coupling, and at least one projection on each of said members gripping over each other with a common surface mainly parallel with the said axis at such an axial distance from the two ends, inserted one in the other, that said elongated portion and said projections engaging each other in cooperation with the inserted ends constitute means keeping the coupling members locked and maintained in connected position, an elastic means located between said mouths of said coupling members, causing an axial pressure on said perpendicularly arranged projection surfaces, and counteracting an unintentional separation of the coupling members, but yielding elastically when the members are moved axially towards one another, said movement bringing the projection surfaces, which are parallel with the coupling axis, out of contact with one another, so that said coupling members can, by radially angular movement relative to one another, be separated, one of said members, at the portion where the one is inserted within the other being cylindrical and being provided with an annular groove, a packing operatively engaging in said groove, and against the adjacent wall of the other member, said adjacent wall of said other member also being cylindrical, one of said tubular members being provided with a swingable throttle located within said one member, a pivot pin on which said throttle is mounted, said pin extending transversely across said one member and passing through its wall, a lever mounted on the end of said pin at the outside of said one of said members for turning said pin and throttle, and knob means on the member placed on each side of said lever, securing its position in the axial direction of the coupling, from which position said lever can be turned when lifted over said knobs.

References Cited in the file of this patent

UNITED STATES PATENTS

| | | |
|---|---|---|
| 210,209 | Pfaudler | Nov. 26, 1878 |
| 398,059 | Leland | Feb. 19, 1889 |
| 407,456 | Williams | July 23, 1889 |
| 591,136 | Lucas | Oct. 5, 1897 |
| 744,073 | Henderson | Nov. 17, 1903 |
| 850,622 | Clark | Apr. 16, 1907 |
| 1,020,022 | Burke | Mar. 12, 1912 |
| 1,022,927 | Bradley | Apr. 9, 1912 |
| 1,366,381 | Gullborg et al. | Jan. 25, 1921 |
| 1,428,933 | Bean | Sept. 12, 1922 |
| 1,994,007 | Tallant et al. | Mar. 12, 1935 |
| 2,487,311 | Chapin | Nov. 8, 1949 |
| 2,670,222 | Dragon | Feb. 23, 1954 |